United States Patent [19]

Sugiura

[11] Patent Number: 4,561,764
[45] Date of Patent: Dec. 31, 1985

[54] CONTROL SYSTEM FOR SCANNING ARRANGEMENT

[75] Inventor: Masamichi Sugiura, Toyokawa, Japan

[73] Assignee: Minolta Camera Kabushiki Kaisha, Osaka, Japan

[21] Appl. No.: 671,640

[22] Filed: Nov. 15, 1984

[30] Foreign Application Priority Data

Nov. 16, 1983 [JP] Japan .................................. 58-216699

[51] Int. Cl.$^4$ ............................................. G03G 15/00
[52] U.S. Cl. ........................................ 355/8; 355/14 R
[58] Field of Search ................ 355/8, 14 R, 14 C, 3 R

[56] References Cited

U.S. PATENT DOCUMENTS

| | | | |
|---|---|---|---|
| 4,159,173 | 6/1979 | Kasuga | 355/14 R X |
| 4,332,461 | 6/1982 | Cail et al. | 355/14 R |
| 4,371,254 | 2/1983 | Beery | 355/14 R X |
| 4,383,753 | 5/1983 | Inuzuka et al. | 355/8 |

Primary Examiner—A. C. Prescott
Attorney, Agent, or Firm—Price, Gess & Ubell

[57] ABSTRACT

A control system for a scanning arrangement adapted to be driven for reciprocating movements by a motor, which includes a power source circuit, a circuit for outputting a signal upon turning off of the power source, provided in the power source circuit, a capacitor connected in parallel with the motor, provided at a stage subsequent to the power source off signal output circuit in the power source circuit, and a control section for driving the motor, arranged to control in such a manner as to brake the motor upon output of the power source off signal from the power source off signal output circuit during energization of the motor, so that the scanning arrangement is successfully reduced in speed so as to be stopped, even when the power source is turned off during movement of the scanning arrangement.

6 Claims, 18 Drawing Figures

CONTROL SYSTEM FOR SCANNING ARRANGEMENT

BACKGROUND OF THE INVENTION

The present invention generally relates to a control system for a scanning arrangement and more particularly, to a control system for a scanning arrangement subjected to reciprocating movements by an electric motor controlled for its energization by a microcomputer. The scanning arrangement as referred to above is employed for an electrophotographic copying machine of a scanning exposure type, an image reader of a scanning type or the like.

Subsequently, the control system of the above described type will be explained hereinbelow with reference to a scanning arrangement of an electrophotographic copying machine.

Generally, electrophotographic copying machines are provided with different scanning modes, i.e. various scanning speeds and scanning distances according to sizes of original documents and copy paper sheets or copying magnifications. Therefore, scanning arrangements are required to be so controlled as to successfully carry out the intended scanning based on such scanning modes.

The reciprocating movements of a scanning arrangement include a displacement for scanning images of an original document (referred to as a scanning movement hereinbelow) and another displacement for returning to a home position which is a starting point of the scanning movement (referred to as a returning movement hereinbelow), and the control for the scanning movement is effected, for example, in such a manner that a driving motor is turned on and off in a predetermined very short period of time, while the time for the on period is increased or decreased according to the measured speed.

Meanwhile, for the control of the returning movement, there have been known the following two practices.

One practice is disclosed, for example, in U.S. Pat. No. 4,332,461 to Cail et al., in which a constant speed control is effected also in the returning period in the similar manner as in the scanning period, and in that case, the speed is raised to be high for acceleration of the returning of the scanning arrangement.

The other practice is such that all the restoring force is applied during the start of the return so as to apply braking at a predetermined timing, and in U.S. Pat. No. 4,371,254 to Beery, for example, it is so arranged that the scanning arrangement is caused to return by a restoring force of a return spring, with a magnet brake being applied at a predetermined timing during the returning.

For the improvements of the known practices as described above, there have been proposed by the present assignee, the control systems wherein the returning by the return spring is replaced by a returning utilizing a driving force of a motor, for example, in U.S. patent application No. 511,390 "A system for controlling the reciprocation of a scanning arrangement" by Ikenoue, filed July 5, 1983 and U.S. patent application No. 521,624 "A system for controlling reciprocation of a scanning arrangement" by Sugiura, filed Aug. 9, 1983.

In any of the above practices, the speed during the returning is adapted to be considerably high. If the power supply should be turned off by a certain cause while the scanning arrangement is returning at high speeds, said scanning arrangement is further displaced by the inertia, thus resulting in a violent collision thereof with a stopper member or the like provided at the home position in some cases.

SUMMARY OF THE INVENTION

Accordingly, an essential object of the present invention is to provide an improved control system for a scanning arrangement, which is capable of preventing an accidental collision of the scanning arrangement with a stopper member or the like, by applying a forcible or coercive braking based on a voltage applied to a motor upon turning off of a power source in order to overcome the disadvantages inherent in the conventional control systems of this kind.

Another important object of the present invention is to provide a control system of the above described type which is simple in construction and stable in functioning at a high reliability.

In accomplishing these and other objects, according to one preferred embodiment of the present invention, there is provided a control system for a scanning arrangement arranged to be driven for reciprocating movements by a motor, which includes a power source circuit, means for outputting a signal upon turning off of the power source, provided in the power source circuit, a capacitor means connected in parallel with the motor, provided at a stage subsequent to the power source off signal output means in the power source circuit, and a control means for driving the motor, arranged to control in such a manner as to brake the motor upon output of the power source off signal from the power source off signal output means during energization of the motor, whereby the scanning arrangement is successfully reduced in speed so as to be stopped, even when the power source is turned off during movement thereof.

By the arrangement of the present invention as described above, an improved control system for a scanning arrangement has been advantageously presented.

BRIEF DESCRIPTION OF THE DRAWINGS

These and other objects and features of the present invention will become apparent from the following description taken in conjunction with the preferred embodiment thereof with reference to the accompanying drawings, in which;

FIG. 1b is a cross sectional view taken along a line Ib—Ib shown in FIG. 1a;

DESCRIPTION OF THE PREFERRED EMBODIMENT

Figure 1A:
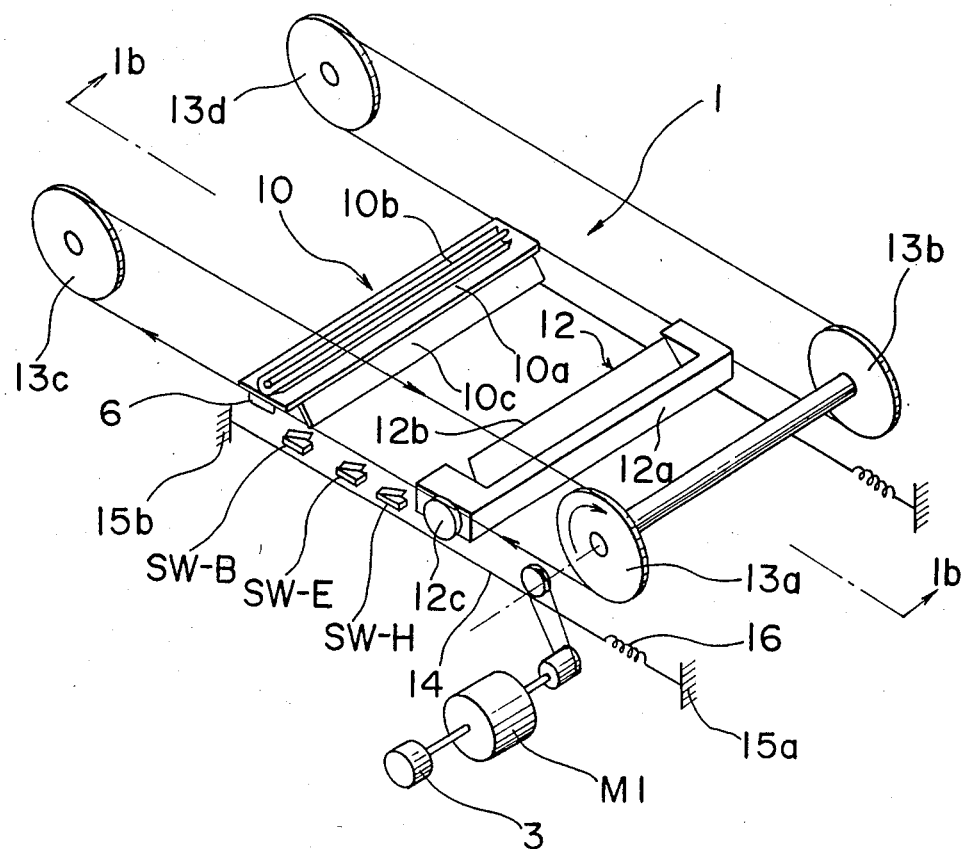
FIG. 1a is a diagrammatic view of a scanning arrangement employed in an electrophotographic copying machine.
Figure 1B:
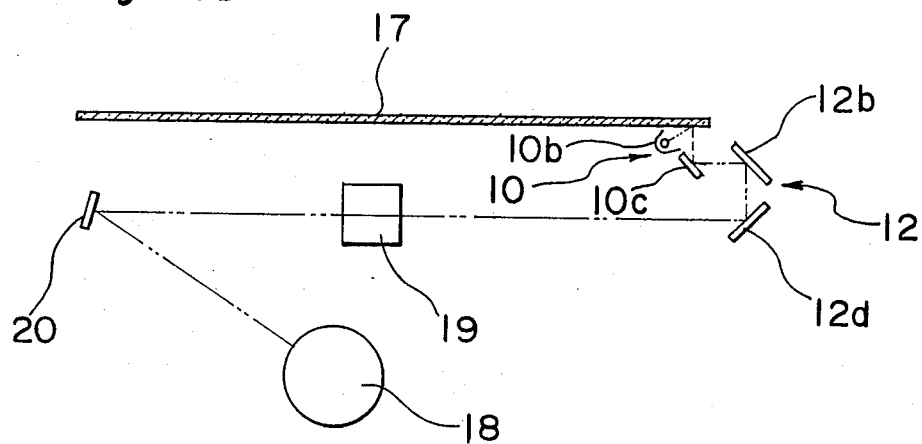

Referring to FIGS. 1a and 1b, a scanning arrangement 1 according to the preferred embodiment of the present invention is shown for use in a copying machine of a type capable of making copies of various sizes and various magnifications. The scanning arrangement 1 comprises a first carrier 10 and a second carrier 12. The first carrier 10 includes a carrier support 10a, on which a light source 10b is mounted on one side, and a first mirror 10c is mounted along the side thereof. The second carrier 12 includes a carrier support 12a, on which second and third mirrors 12b and 12d are mounted along the side thereof, and a pair of rolls 12c mounted on the opposite ends. A ribbon of light emitted from the light source 10b reflects on an original document (not shown) on a platen 17 and further reflects on the first, second and third mirrors 10c, 12b and 12d, and is directed towards a photoreceptor surface 18 through a projection lens 19 and fixed mirror 20.

The scanning arrangement 1 further includes a D.C. motor M1 designed to rotate in two directions, an encoder 3 connected to the D.C. motor M1 for producing a train of pulses having a frequency corresponding to the speed of the D.C. motor M1. The rotating force of the motor M1 is transmitted, through a suitable transmission means, to a first pair of wheels 13a and 13b which are axially connected to each other and are journalled to a housing (not shown). The first pair of wheels 13a and 13b are located at one end of the scanning arrangement 1, and a second pair of wheels 13c and 13d are provided at the other end of the scanning arrangement.

A string 14 is connected to the housing at a point 15a, and extends around the roll 12c and the wheel 13a. The string 14 further extends around the wheel 13c and the roll 12c, and is connected to the housing at a point 15b. To keep the string 14 tightly extended, a suitable spring 16 is provided. Between the wheel 13c and the roll 12c, the string 14 is fixedly connected to the carrier support 10a. As shown in FIG. 1a, another string is provided on the other side of the scanning arrangement 1.

Switches SW-H, SW-E and SW-B are provided along the path of the first carrier 10 so that a cam 6 provided on the carrier support 10a actuates the switches SW-H, SW-E and SW-B during the movement of the first carrier 10 in a manner which will be described later. The switch SW-H, referred to as a home switch, is provided for detecting when the scanning arrangement 1 is moved to its home position, and the switch SW-B, referred to as a brake switch, is provided to start braking the scanning arrangement 1 during the return movement of the scanning arrangement 1. The switch SW-E, referred to as an exposure switch, is provided for generating a signal for starting the exposure and for controlling various operations described below. Each of the switches SW-H, SW-E and SW-B is a normally-open switch and, is turned on when the cam 6 actuates it.

When the wheels 13a and 13b rotate in a direction shown, the string 14 moves in a direction shown at a speed f. Thus, the first carrier 10 connected to the string 14 moves at the speed f. Because the string 14 is provided around the roll 12c, the second carrier 12 moves at the speed f/2 in the same direction as the direction of movement of the first carrier 10. When the scanning arrangement is in the home position, the first carrier 10 is shifted towards the first pair of wheels 13a and 13b such that the cam 6 is located in a position to actuate the home switch SW-H.

From the home position, the first carrier 10 moves towards and close to the second pair of wheels 13c and 13d to effect a scan movement of the scanning arrangement. During the scan movement, the cam 6 of the carrier 10 actuates the exposure switch SW-E thereby exposing the original document. Thereafter, the scanning arrangement returns back towards the home position. During the return of the scanning arrangement and when the carrier 10 actuates the braking switch SW-B, a brake timer starts to count a predetermined amount of time, and thereafter, a braking effect is provided to the carrier 10, and such a braking effect is continued until the scanning arrangement is returned very close to the home position, as will be described in detail later. When the scanning arrangement returns back to a position very close to the home position, it is further returned at a constant low speed Vret for a play distance and, thereafter, it gently returns to the home position with less deviation. According to the present invention, a microcomputer is provided for memorizing said play distance. When said play distance becomes rather long, the microcomputer so calculates as to prolong the amount of time which the brake timer has to count to make the play distance in a subsequent scan as short as possible, thereby shortening (in time) the entire copying operation.

The above described movement of the first carrier 10 accompanies the movement of the second carrier 12, but in half the speed of the first carrier 10.

Figure 4:
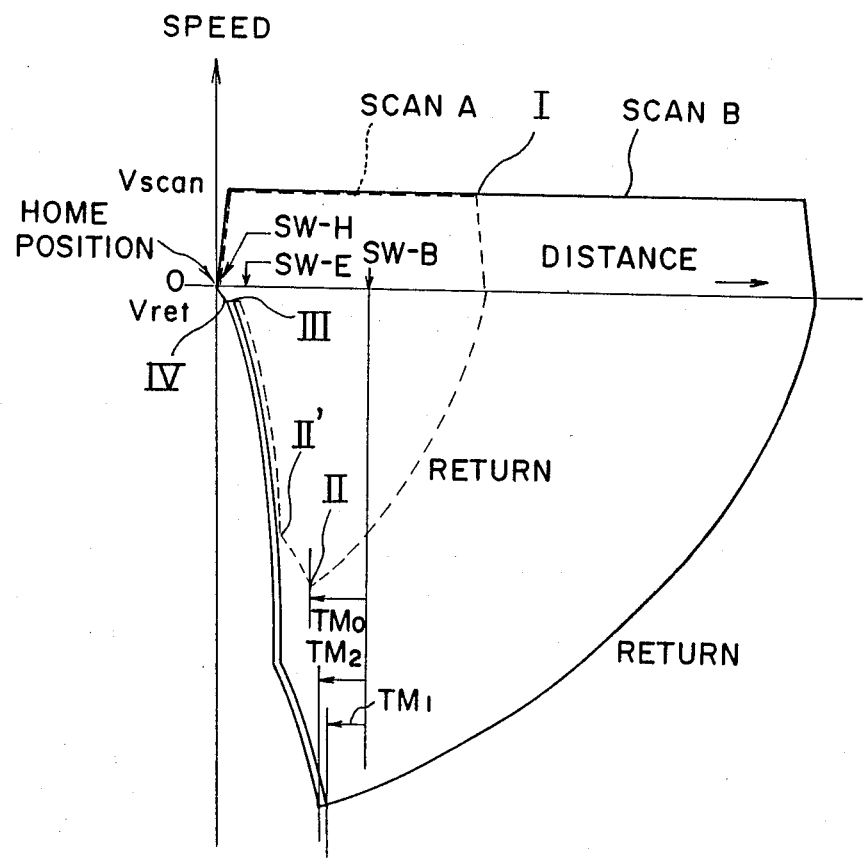
FIG. 4 is a graph showing a pattern of movement of a scanning arrangement according to the preferred embodiment of the present invention.

When particularly observing the first carrier 10, the movement of the carrier 10 can be diagrammatically depicted as shown in the graph of FIG. 4, wherein abscissa and ordinate represent, respectively, position and speed. In the graph, the position 0 is the home position. According to the present invention, the scanning arrangement carries out a test, or provisional, scan A and a normal scan B. The test scan A is carried out at the beginning of each succession of copies. As shown by a dotted line, the provisional scan A starts from the position 0 such that the carrier 10 is accelerated up to a speed Vscan by an electric power incessantly applied to the motor M1, within the prerunning distance and, thereafter, it is moved at the constant speed Vscan by an electric power intermittently applied to the motor M1. Then, at a point I, the carrier 10 is forced to return back by an incessant power supplied to the motor M1 to turn in the reverse direction. The returning force is given constantly until a point II, that is, until the brake timer completes counting a predetermine amount of time, e.g., TM0. Thereafter, a braking effect is given to the carrier 10 until its speed is reduced to Vret, i.e., until a point III. Then, the carrier 10 is further returned back at the constant speed Vret until it is moved to a position very close to the home position. Thereafter, the carrier 10 is again braked to return it exactly to the initial position, i.e., the home position. During the above described provisional scan, the microcomputer counts a time period between the points III and IV and stores the counted time for use in controlling the return movement for the subsequent normal scan B in such a manner as to make the time between points III and IV as short as possible. This is done by changing the time amount to be counted in the brake timer. When the provisional scan A is completed, a normal scan B is carried out repeatedly in a manner shown by a solid line in FIG. 4. Each time the normal scan B is carried out, the microcomputer counts and memorizes the time period between the points III and IV, and uses the counted time to change the amount of time to be counted by the brake timer in the return movement for the subsequent normal scan B. Accordingly, the return movement for the subsequent normal scan B is carried out with a shorter time between the points III and IV.

The above described movements of the first carrier 10 is effected by the D.C. motor M1, and the driving of the motor M1 is controlled by a control system described in detail below.

Figure 2:
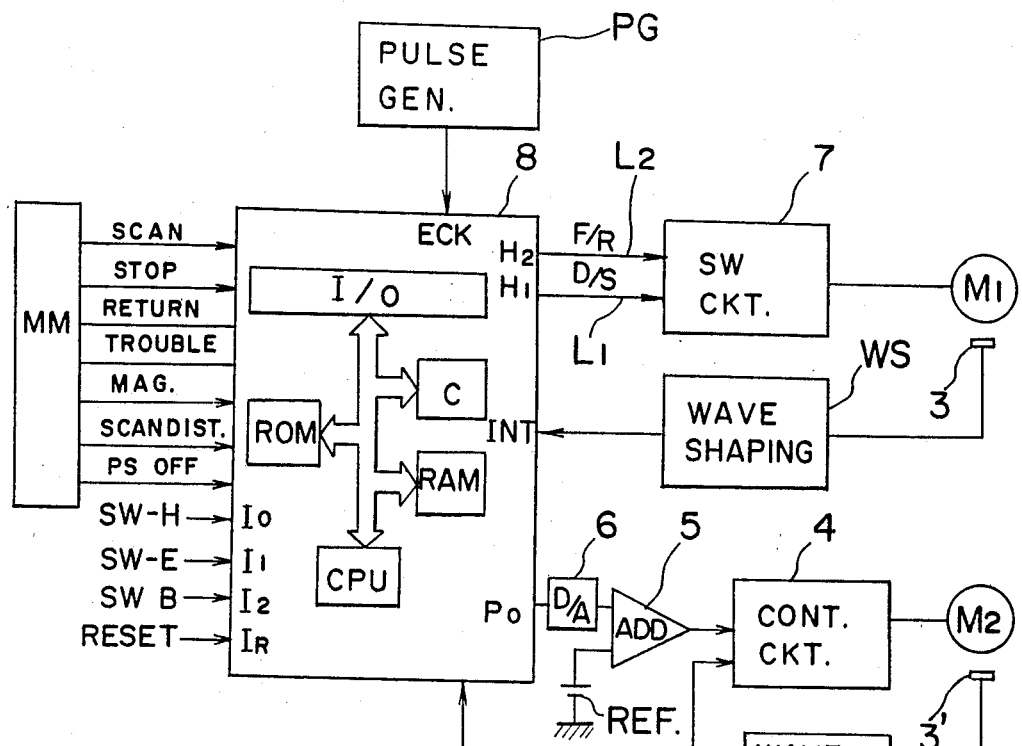
FIG. 2 is a block diagram showing a control system for reciprocation of scanning arrangement according to the present invention.

Referring to FIG. 2, a block diagram of a control system for controlling the motor M1 comprises a master computer MM, a micro-computer 8, a pulse generator PG for generating a train of clock pulses having a frequency, e.g., 200 kHz, a wave shaping circuit WS for wave shaping the pulses obtained from the encoder 3, and a switching circuit 7 for driving the motor M1. The pulse produced from the wave shaping circuit is applied to a terminal INT of the microcomputer 8, and by the step-up or step-down edge of the pulse, the microcomputer 8 starts to carry out an interruption routine procedure, which will be described in detail later in connection with FIGS. 7 and 8. The switching circuit 7 is connected through lines L1 and L2 to terminals H1 and H2, respectively, of the microcomputer 8. The terminal H2 produces a HIGH or LOW signal representing forward or reverse direction of rotation, and the terminal H1 produces a HIGH or LOW signal representing drive or non-drive mode. The combination of signals on the lines L1 and L2 provides various different modes, as will be described later.

According to the preferred embodiment, the control system further includes a control circuit 4 for controlling a motor M2, which is provided for driving a photoreceptor drum 18 (FIG. 1) and other associated parts (not shown). Like the motor M1, the motor M2 is provided with an encoder 3' from which a train pulses corresponding to the speed of the motor M2 is produced. The train of pulses from the encoder 3' is applied to a wave shaping circuit WS' and further to the control circuit 4 and also to the microcomputer 8. The microcomputer 8 uses the train of pulses from the wave shaping circuit WS' to synchronize the scan of the scanning arrangement with the rotation of the photoreceptor drum. Also, the train of pulses from the wave shaping circuit WS' is fed to a D/A (digital-to-analog) converter 6 and further to an adder 5. Thus, the D/A converter 6 produces an analog signal having a level corresponding to the speed of the motor M2, and the adder 5 produces an analog signal which is the sum of the analog signal from the D/A converter 6 and a predetermined reference level. The signal from the adder 5 is applied to the control circuit 4 for controlling the motor M2 to the required speed.

It is to be noted that since the scanning arrangement is driven not only under a constant speed mode, but also under a full acceleration mode or under a brake mode, the scan motor M1 is controlled by a pulse-duration modulation (PDM) wherein the duty cycle of power, supplied in a form of pulses, is changed with respect to the required mode. Contrary, the photoreceptor drum is driven only under the constant speed mode and, therefore, the main motor M2 is controlled by the change of amplitude of the power applied thereto. Thus, the switching circuit 7 is a type which controls the pulse-duration of the power supplied to the motor M1, and the control circuit 4 is a type which controls the amplitude of the power supplied to the motor M2.

The master computer MM is provided for controlling the various operations, such as paper feeding operation and image forming operation, etc., in a predetermined sequence to carry out the copying operation. And in a synchronized manner with such sequential operations, the master computer MM produces scan signal for effecting the scan A or B, and stop signal for stopping the scan. It also produces a magnitude signal indicating the enlarging or reduction factor, and a scan distance signal indicating the size of copy paper. Furthermore, the master computer MM receives return signal and trouble signal from the microcomputer 8. In addition, the microcomputer 8 receives HIGH or LOW from the switches SW-H, SW-E and SW-B to inputs I0, I1 and I2, respectively, and also receives a reset signal and a power source signal from a power source circuit in FIG. 15 to be described later.

The micro-computer 8 includes an input and output port I/0, a read-only-memory ROM, a central-processing-unit CPU, a random-access-memory RAM capable of reading and writing as desired for storing data for braking control, and a counter C. In addition to the above-mentioned signals, the micro-computer 8 further receives clock pulses from the pulse generator PG, and a train of pulses representing the speed of the scanning arrangement from the encoder 3 through the wave shaping circuit WS. By using the clock pulses from the pulse generator PG, the micro-computer 8 counts the time interval between two pulses from the encoder 3, thereby detecting the speed of the scanning arrangement. And, by using these and other signals, the micro-computer 8 produces from its terminals H1 and H2 control signals which are provided through lines L1 and L2 to the switching circuit 7 for controlling the D.C. motor M1.

Figure 3:
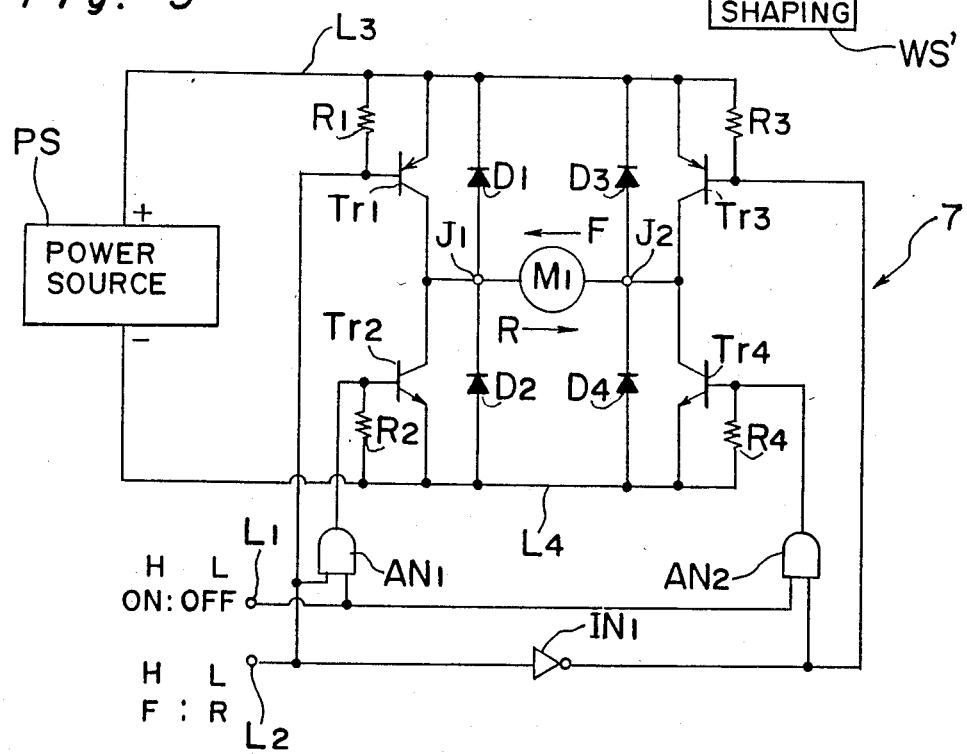
FIG. 3 is a circuit diagram of a switching circuit shown in FIG. 2.

Referring to FIG. 3, the switching circuit 7 comprises a power source PS for supplying D.C. power from a line L3 to a line L4. The power source PS is designed for providing power equal to or less than the maximum rated power of the motor M1, thereby preventing the motor M1 from being damaged even during the return movement of the scanning arrangement. Across the lines L3 and L4, diodes D1 and D2 are connected in series in reverse bias direction, and diodes D3 and D4 are connected in series in reverse bias direction. A junction J1 between the diodes D1 and D2 is connected to one end of the D.C. motor M1, and a junction J2 between the diodes D3 and D4 is connected to the other end of the D.C. motor M1. Transistors TR1 and TR3 are connected parallel to the diodes D1 and D3, respectively, with resistors R1 and R3 connected between the base thereof and the line L3. Similarly, transistors TR2 and TR4 are connected parallel to the diodes D2 and D4, respectively, with resistors R2 and R4 connected between the base thereof and the line L4.

The line L1 from the micro-computer 8 is connected to one input of an AND gate AN1 and also to one input of another AND gate AN2. The line L2 from the microcomputer 8 is connected to the other input of the AND gate AN1, and also to the base of the transistor Tr1. The line L2 is further connected through an inverter IN1 to the other input of the AND gate AN2 and also to the base of the transistor Tr3. The output of the AND gate ANI is connected to the base of the transistor Tr2, and the output of the AND gate AN2 is connected to the base of the transistor Tr4.

It is to be noted that the diodes D1, D2, D3 and D4 are provided to cut off the counter electromotive force produced during the forward driving or when the operating mode, which will be described below, is changed from one to another, thereby protect the the transistors Tr1, Tr2, Tr3 and TR4 from the abnormal voltages.

Depending on the combination of HIGH and LOW signals appearing on the lines L1 and L2, the switching circuit 7 shown in FIG. 3 takes one of four different modes of operations, which are: forward mode effected during the movement of the first carrier 10 between the points 0 and I shown in FIG. 4; reverse drive mode effected during the movement of the first carrier 10 between the points I and II; brake mode effected during the movement of the first carrier 10 between the points II and III, and between the points IV and 0; and reverse mode effected during the movement of the first carrier 10 between the points III and IV.

The forward mode can be divided into forward drive mode (FD) and forward non-drive mode (FN). The forward drive mode (FD) is accomplished when both lines L1 and L2 carry HIGH. Accordingly, the transistors Tr3 and Tr2 are turned to conductive state, and the transistors Tr1 and Tr4 are turned to non-conductive state, thereby allowing current flow from the line L3 through the transistor Tr3, motor M1 and transistor Tr2 to the line L4. Thus, by the current flow in the direction indicated by an arrow F, the motor M1 is driven incessantly in the forward direction, thereby accelerating the scanning arrangement.

The forward non-drive mode (FN) is accomplished when the line L2 carries HIGH, and the line L1 carries LOW. Under this mode, only the transistor Tr3 is turned on, and the rest of the transistors are turned off. Thus, the current flow F is interrupted, thereby running the motor forwardly by the inertia.

In the forward mode between the points 0 and I, first the forward drive mode (FD) takes place continuously to accelerate the scanning arrangement to the required speed Vscan, and thereafter, the forward drive mode (FD) and the forward non-drive mode (FN) take place alternately at a predetermined frequency depending on the required speed Vscan. In other words, after the acceleration to the required speed Vscan, the line L2 carries HIGH and the line L1 alternately carries HIGH and LOW to drive the motor M1 intermittently in the forward direction, thereby moving the scanning arrangement forwardly at a constant speed Vscan.

The reverse drive mode (RD) is accomplished when the line L2 carries LOW, and the line L1 carries HIGH. In this mode, the transistors Tr1 and Tr4 are turned to conductive state and the transistor Tr2 and Tr3 are turned to non-conductive state, thereby allowing current flow from the line L3 through the transistor Tr1, motor M1 and transistor Tr4 to the line L4. Thus by the current flow in the direction indicated by an arrow R, the motor M1 is driven incessantly in the reverse direction, effecting the rapid return of the scanning arrangement.

The brake mode can be divided into a regenerative brake mode (FN) which takes place between the points II and II', and a coercive brake mode (FD) which takes place between the points II' and III. The regenerative brake mode (FN) is accomplished when the line L2 carries HIGH, and the line L1 carries LOW. The regenerative brake mode (FN) has the transistors conditioned in the same manner as in the forward non-drive mode (FN) and, therefore, both modes are indicated as (FN). Thus, in the regenerative brake mode (FN), only the transistor Tr3 conducts and the transistors Tr1, Tr2 and Tr4 are turned to non-conductive state. Since the regenerative brake mode is presented while the scanning arrangement is moving in the return direction at a high speed, the motor M1 operates as a generator producing regenerated current in the direction F. The regenerated current flows through the transistor Tr3, motor M1 and diode D1, and generates the counter electromotive force effective to braking.

The coercive brake mode (FD) is accomplished when both lines L1 and L2 carry HIGH to permit current flow in the direction F. As understood from the above, the coercive brake mode has the transistors conditioned in the same manner as that in the forward drive mode (FD). But, since the coercive brake mode takes place while the scanning arrangement is moving in the return direction, the forward driving force serves as a coercive braking force.

More specifically, in the above coercive brake mode (FD), the input terminals L1 and L2 are changed over to High state during returning, for energizing the motor M1 to rotate in the forward direction, whereby the motor M1 tends to rotate in the forward direction, thus forcibly applying the braking action to the movement of the scanning arrangement which urges the motor shaft to rotate in the reverse direction.

The reverse mode is accomplished by alternately presenting reverse drive mode (RD), as mentioned above, and reverse non-drive mode (RN). Under the reverse non-drive mode (RN), the line L2 carries LOW and the line L1 carries LOW. Thus, in the reverse mode, the transistor Tr1 is maintained conductive, and the transistors Tr2 and Tr3 are maintained non-conductive. Furthermore, the transistor Tr4 are alternately turned conductive and non-conductive. Accordingly a current intermittently flows through the motor M1 in the direction R, thereby moving the scanning arrangement in the reverse direction at a constant speed Vret.

Next, a program given to the micro-computer 8 for controlling the scanning arrangement is described in connection with the flow chart shown in FIGS. 6 through 14.

Figure 6:
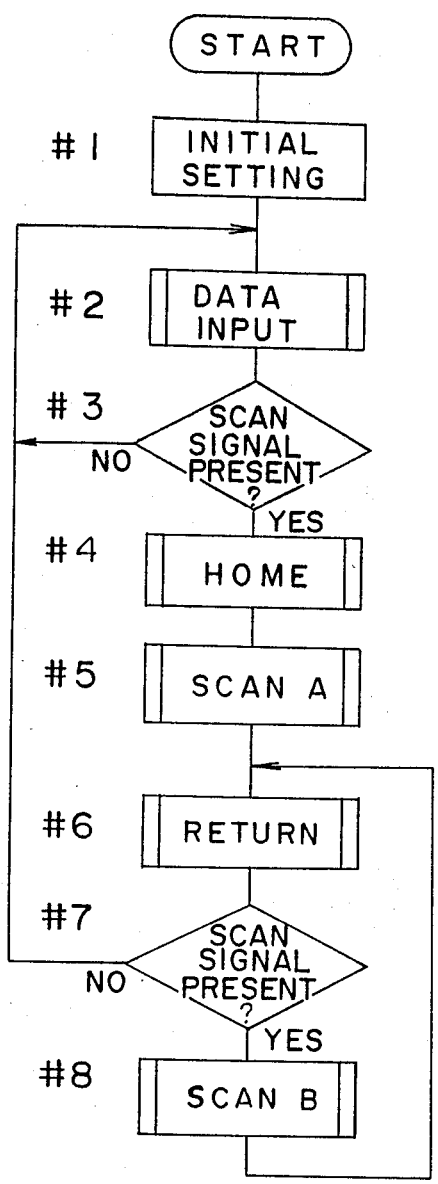
FIG. 6 is flow charts of a main routine according to the preferred embodiment of the present invention.

Referring to FIG. 6 a main routine is shown. When a main switch (not shown) is turned on, the main routine starts, and in the step #1, various parameters are set up in the microcomputer 8 for the initial setting. Then, in the step #2, various data, such as magnification and scan distance, are inputed. Such data may be renewed until the scan signal is present, as detected in the step #3. Then, in the step #4, a subroutine HOME is carried out for properly positioning the scanning arrangement to the home position.

Thereafter, in the step #5, a subroutine SCAN A is carried out for effecting the provisional scan, so as to obtain data for the subsequent normal scan B. It is to be noted that the subroutine SCAN A, as well as a subroutine SCAN B, controls the movement of the scanning arrangement from the position 0 to the position I, while a subroutine RETURN, as effected in the next step #6, controls movement of the scanning arrangement from the position I back to the home position 0.

During the subroutine RETURN, various data are gathered for use in the next subroutine RETURN. Then, in the step #7, it is discriminated whether the scan signal is still present or not. If it is still present, the program goes to the step #8 to carry out the subroutine SCAN B and repeats the steps #6, #7 and #8. If the scan signal is not present, the procedure returns back to repeat the program from the step #2.

Figure 5:
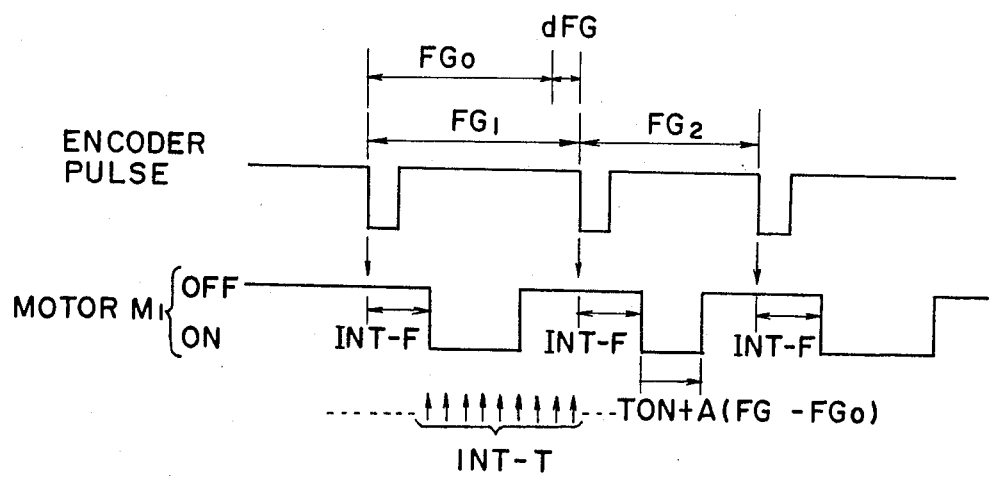
FIG. 5 is a graph showing waveforms of encoder pulses and power supplied to a motor M1 for driving the scanning arrangement.

Before describing each of the subroutines, a manner in which the motor M1 is driven at a constant speed is described first. When the motor M1 runs, the encoder 3 produces a train of pulses as shown in FIG. 5, top row. While the motor M1 is running, the microcomputer 8 so controls the switching circuit 7 to provide power to the motor M1 for a predetermined period of time TON within each pulse spacing between consecutive encoder pulses. During the time TON, the switching circuit 7 is either in forward drive mode (FD) or reverse drive mode (RD), while in the remaining time, the switching circuit 7 is either in forward non-drive mode (FN) or reverse non-drive mode (RN), thereby maintaining the required speed. The motor speed is being incessantly examined by microcomputer 8 such that pulse spacings FG1, FG2, ... between two consecutive encoder pulses are measured, and each pulse spacing FGn is compared with a reference pulse spacing FG0. It is to be noted that the reference pulse spacing FG0 is a previously set time capable of running the motor M1 at the required speed.

If the motor speed deviates from the required speed, it is corrected in the following manner. A counter in the microcomputer 8 counts a pulse spacing, such as FG1 shown in FIG. 5, and the counted pulse spacing FG1 is compared with a reference pulse spacing FG0 to obtain a difference dFG therebetween through a calculation:

dFG=FG1−FG0.

When the detected pulse spacing FG1 is longer than the reference pulse spacing FG0, the scanning speed is slower than the required speed, and when the detected pulse spacing FG1 is shorter than the reference pulse spacing FG0, the scanning speed is faster than the required speed. The difference dFG is multiplied by a constant A and, then, is added with a reference pulse duration TON, thus obtaining TON+A(FG1−FG0) immediately after the counting of the pulse period FG1. If the difference dFG is zero, it is understood that the motor speed is at the required speed. In FIG. 5, this calculation is carried out within a period indicated as INT-F. As shown in FIG. 5, bottom row, the motor M1 is powered on, after the period INT-F, for a calculated period of time TON+A(FG1-FG0). While the motor M1 is controlled in this manner, the timer counts a pulse spacing FG2 for the control of a next power-on period.

According to the preferred embodiment, the scanning arrangement is so controlled as to move at a constant speed Vscan or Vret, as understood from FIG. 4. Therefore, there are at least two different amounts prepared for each of the parameters FG0, A and TON.

Figure 9:
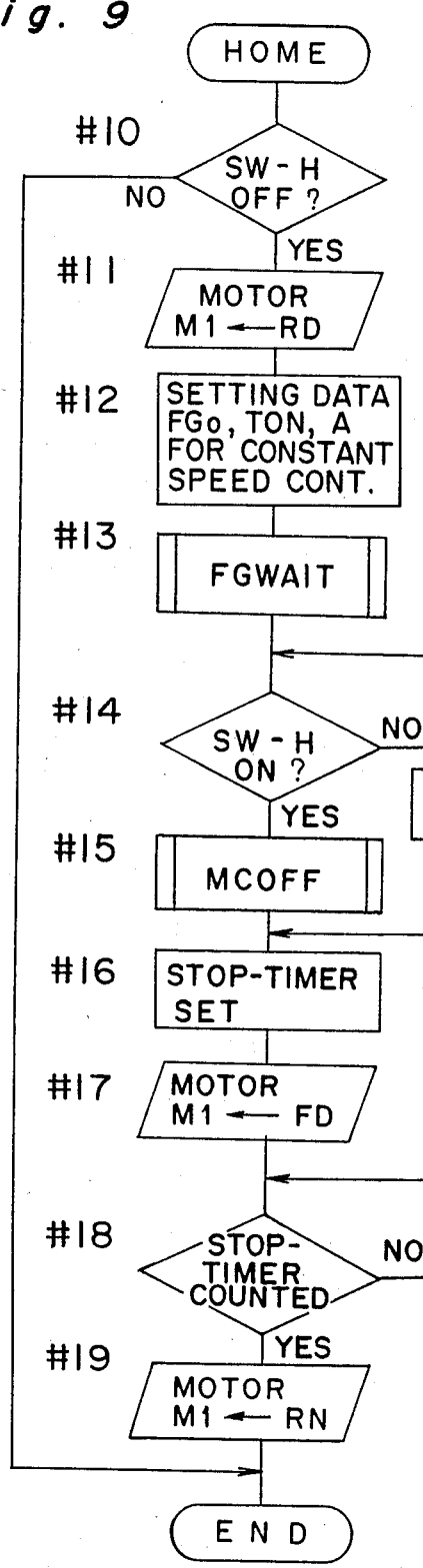
FIG. 9 shows a subroutine for moving the scanning arrangement to the home position.

Next, the subroutine HOME is described in detail. Referring to FIG. 9, it is discriminated whether the home switch SW-H is on or not in the step #10. If the home switch SW-H is not on, it is understood that the scanning arrangement is deviated towards the scanned position. In this case, the switching circuit 7 is set in the reverse drive mode RD, in the step #11, to start moving the scanning arrangement in the return direction at a speed based on the data set up in the next step #12. In the step #12, data FG0, TON and A as stored in ROM and mentioned above are read out and shifted to registers in RAM. Then, in the step #13, a subroutine FGWAIT is carried out for the start of constant-speed control described below.

Figure 10:
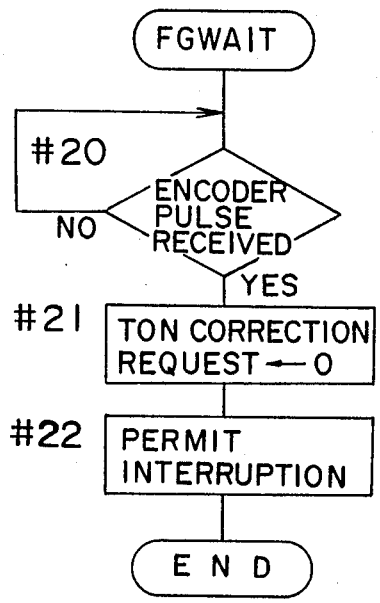
FIG. 10 shows a subroutine for permitting the interruption routine.

Referring to FIG. 10, the subroutine FGWAIT includes the step #20 in which it is discriminated whether an encoder pulse is received or not. If an encoder pulse is received, the program advances to the step #21 so as to set up "0" indicating no request for the TON correction. Then, in the step #22, interruption routines INT-F and INT-T are permitted to be carried out when they are requested. Thereafter, the subroutine FGWAIT ends.

Figure 8:
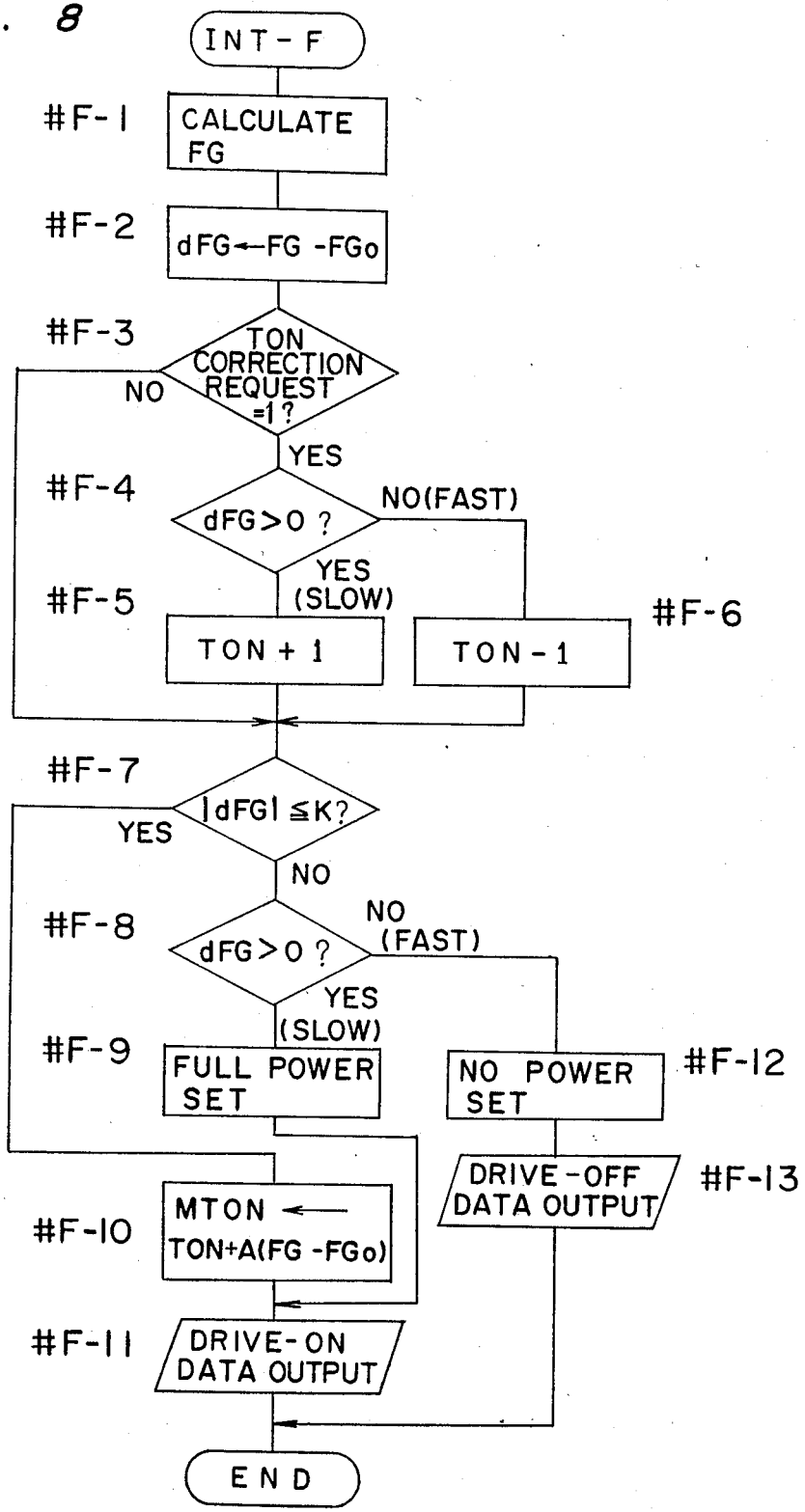
FIG. 8 shows an interruption routine for starting power supply to the motor M1 and calculating the amount of time to be counted in the counter shown in FIG. 7.

Referring to FIG. 8, a flow chart of an interruption routine INT-F is shown. The interruption routine INT-F is carried out in response to each encoder pulse, as indicated in FIG. 5. In the step #F-1, the pulse spacing FG, such as FG1 is calculated and, in the next step #F-2, the difference dFG=FG−FG0 is calculated. Then, in the step #F-3, it is discriminated whether there is a request for the TON correction or not. Since there is no such a request as introduced in the step #21, the program advances to the step #F-7, wherein it is discriminated whether the absolute of the difference dFG is within a tolerance K or not. If the difference dFG is within the tolerance K, the calculation TON−A(FG-FG0) is carried out in the step #F-10, and the calculated amount is stored in a register MTON. Then, at the step #F-11, a drive-on data is produced and, after that, the program returns back to the subroutine HOME. By the drive-on data, the microcomputer 8 produces from its terminals H1 and H2 signals that set the switching circuit 7 in the reverse drive mode (RD).

Back to the step #F-7, if the difference dFG is not within the tolerance K, it is further discriminated in the step #F-8 whether the difference dFG is positive or negative. If it is positive meaning that the scanning speed is very slow, the program advances to the step #F-9 for setting the full power, or maximum amount, in the register MTON, thereby incessantly supplying electric power to the motor M1 without any interval. If the difference dFG is negative meaning that the scanning speed is very high, the program advance to the step #F-12 for setting no power, or minimum amount, in the register MTON, thereby supplying no electric power to the motor M1. In this case, since the motor M1 remains de-energized, a drive-off data is produced in the step #F-13.

Figure 7:
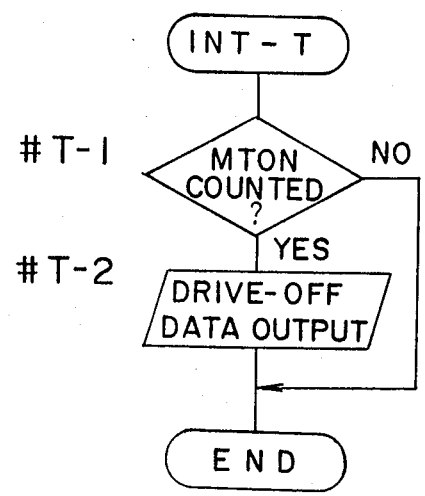
FIG. 7 shows an interruption routine for counting time for supplying power to the motor M1.

Referring to FIG. 7, a flow chart of an interruption routine INT-T is shown. The interruption routine INT-T is carried out in response to the count-up of the counter provided in the microcomputer 8. According to the preferred embodiment, the counter provided in the microcomputer 8 is an 8-bit counter capable of counting $2^8 = 256$ clock pulses which is equal to 1.28 ms and, therefore, the interruption routine INT-T is repeated periodically with a time interval of 1.28 ms. The interruption routine INT-T is carried out as follows. In the step #T-1, it is discriminated whether the content of the register MTON is counted up to the required amount or not. If the content of the register MTON is not counted up yet, or if the content of the register MTON is initially minimum, e.g., zero, the interruption routine INT-T ends, and thus, the program returns back to the subroutine HOME. If the content of the register MTON is counted up to the required amount, the program advances to the step #T-2 wherein drive-off data is produced, thereby the microcomputer 8 produces from its terminals H1 and H2 signals that set the switching circuit 7 temporarily in the return non-drive mode (RN).

According to the subroutine HOME, since the register MTON is stored with a calculated amount TON+A(FG1−FG0), the interruption routine INT-T (through the steps "INT-T", "#T-1" and "END") is carried out for a number of times necessary to count a time TON+A(FG1−FG0), and, during counting the motor M1 is driven under the reverse drive mode (RD). Thereafter, when the time TON+A(FG1−FG0) is counted, the interruption routine INT-T (through the steps "INT-T", "#T-1", "#T-2" and "END") is carried out to produce the drive-off data. Thus, the motor M1 continues to run by the inertia under the reverse non-drive mode.

Thus, as indicated in FIG. 5, the interruption routine INT-F is carried out in response to the encoder pulse, and during the interruption routine INT-F, a time duration TON+A(FG1−FG0) is calculated. When the interruption routine INT-F ends, the motot M1 is powered for a period of time TON+A(FG1−FG0). Accordingly, the motor M1 is powered intermittently to control the speed of the scanning arrangement.

Back to FIG. 9, after the step #13, the interruption routine INT-F is repeated for a number of times, and also the interruption routing INT-T is repeated more intensively. Accordingly, the scanning arrangement is returned towards the home position at a constant speed Vret. When the scanning arrangement returns back to the home position, the home switch SW-H is turned on. Accordingly, the program advances from the step #14 to #15 for carrying out a subroutine MCOFF.

Figure 11:
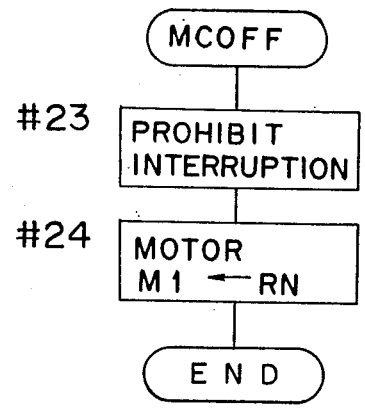
FIG. 11 shows a subroutine for prohibiting the interruption routine.

Referring to FIG. 11, the subroutine MCOFF includes the step #23 for prohibiting any more interruption routine, and the step #24 for turning the switching circuit 7 to the reverse non-drive mode (RN). Therefore, it can be said that the constant speed control is carried out between the subroutines FGWAIT and MCOFF. After the subroutine MCOFF, the program returns back to the subroutine HOME. It is to be noted that the motor M1 is still running in the reverse direction by the inertial even after the subroutine MCOFF.

Referring again to FIG. 9, at the step #16, a stop-timer is actuated to count a predetermined time. Then, at the step #17, the switching circuit 7 is changed to the forward drive mode (FD). Since the motor M1 is now running in the reverse direction by the inertial, the motor M1 receives coercive braking force to stop the rotation. When the stop-timer counts a predetermined time, the program advance from the step #18 to #19, thereby turning the switching circuit 7 to the reverse non-drive mode (RN). It is to be noted that the stop-timer counts a predetermined period of time necessary to stop the scanning arrangement from the speed Vret.

Now, the subroutine HOME ends to position the scanning arrangement properly to the home position. Next, the subroutine SCAN A for carrying out the provisional scan will be described.

Figure 12:
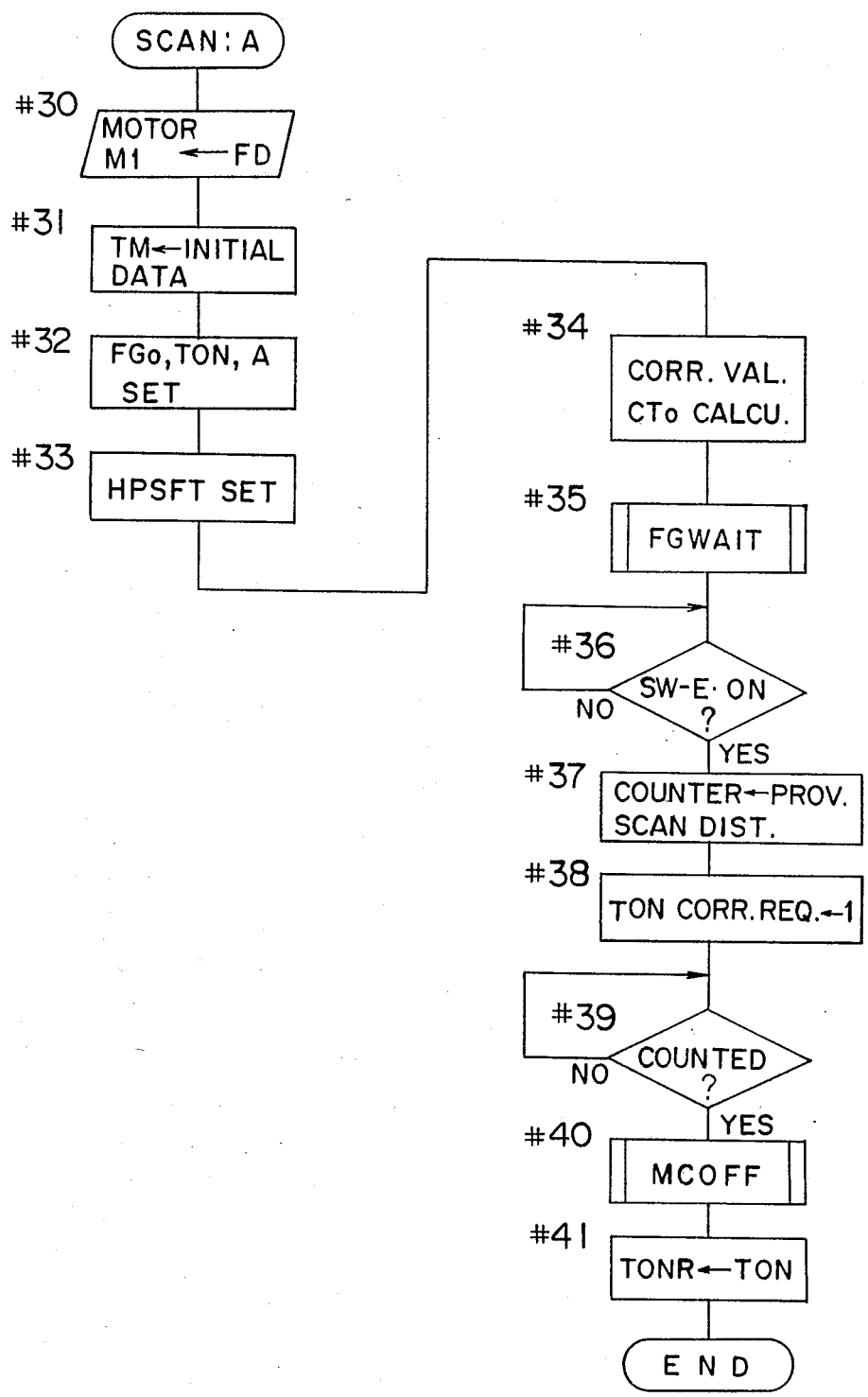
FIG. 12 shows a subroutine for carrying out a scan A.

Referring to FIG. 12, in the step #30, the switching circuit 7 is turned to the forward drive mode (FD). Thus, the scanning arrangement starts to move forward from the home position. It is to be noted that the forward drive mode (FD) continues until at least the first encoder pulse occurs, so as to accelerate the scanning arrangement with an incessant power supply. Also, drive-on data necessary for the forward drive mode (FD), and drive-off data necessary for the forward non-drive mode (FN) are stored in RAM of the microcomputer 8. Then, in the step #31, a register TM is stored with an initial data, such as TM0, for use in a subsequent subroutine RETURN. Next, in the step #32, data FG0, TON and A based on the required magnification are set in the respective registers for the constant speed control, while the home position shift amount HPSFT is set at the step #33. The above HPSFT is a value representing a distance from the rising upon turning on of the home switch SW-H to the shifting to the actual stopping function, and is counted by the delay counter from the rising at the turning on of the home switch SW-H for shifting to the stopping function upon completion of the counting. Simultaneously, at the step #34, a corrected value CTo is calculated from the scan size at the scan B so as to be stored in the register. Such a correction will be necessary to correct the counts of the counter during return after the provisional scan A, because under the provisional scan A, the scan distance is much shorter than that of the normal scan B, and also because the moment, when to start the braking effect, differs with respect to the scan distance.

Next, in the step #35, the subroutine FGWAIT is effected to permit the interruption routines INT-T and INT-F, so that the constant speed control starts after the first encoder pulse.

Then, in the step #36, it is discriminated whether the exposure switch SW-E is on or not. When the exposure switch SW-E turns on, the program advances from the step #36 to #37. In the step #37, the counter is set with an amount of time for the provisional scan A, and in the step #38, "1" indicating the request for the TON correction is set up.

It is to be noted that the counter mentioned in the step #37 is a type which starts to count up in response to each encoder pulse, and is used not only for counting the time necessary for the provisional scan A but also counts time for normal scans B. Furthermore, it counts time TM0, TM1, . . . for the delay of braking effect after the turn on of the brake switch SW-B. Also, it counts time for the constant speed control period III–IV as effected in the steps #16 to #19. For counting time other than the constant speed control period III–IV, that is for counting the time for the scans A and B, and delay of braking effect, the counting is carried out in such a manner that the counter is loaded with a complement of the required period, and when the counter counts up to its maximum and an overflow signal is produced, such an overflow signal indicates that the required period is counted.

As mentioned above, the interruption routines INT-F and INT-T take place repeatedly after the step #35.

Now, the interruption routine INT-F under the provisional scan A is carried out in the following manner. Referring again to FIG. 8, the pulse spacing FG is calculated in the step #F-1, and, in the next step #F-2, the difference dFG=FG−FG0 is calculated. Then, in the step #F-3, it is discriminated whether there is a request for the TON correction or not. Since there is a request as introduced in the step #38, the program advances to the step #F-4, wherein it is discriminated whether the difference dFG is greater than zero or not. If it is greater than zero, it is understood that the scanning speed is slower than the required speed and, therefore, in this case, the program advances to the step #F-5 wherein time TON is added with 1 to increase the power supplying time. Contrary, if it is smaller than zero, the scanning speed is faster than the required speed and, therefore, in this case, the program advances to the step #F-6 wherein time TON is subtracted by 1 to reduce the power supplying time. Therefore, in the steps #F-4 to #F-6, the power supplying time TON is corrected for the first time. Thereafter, in the steps #F-7 to #F-11, particularly in the step #F-10, the power supplying time TON is corrected for the second time, in a manner described above. Thus, in the interruption routine INT-F of the subroutine SCAN A, the register MTON is stored with a twice-corrected power supplying time TON, and the motor M1 is controlled with the use of such a twicecorrected power supplying time TON.

Referring again to FIG. 12, in the step #39, it is discriminated whether the counter has counted the amount of time for the provisional scan A or not. It is needless to say that during the counting, the interruption routines INT-F and INT-T are carried out repeatedly to maintain the scanning speed constant at the required speed Vscan. When the counter has completed counting, i.e., when the scanning arrangement has scanned all the way to the point I of the provisional scan A, as indicated in FIG. 4, the program advances from the step #39 to #40. Accordingly, the subroutine MCOFF is carried out to prohibit any interruption routines (step #23) and to turn the switching circuit 7 temporarily to the reverse non-drive mode (step #24). Then, in the step #41, the corrected power supplying time TON as obtained at the final round of the interruption routine INT-F, i.e., as obtained before the step #40, is stored in a register TONR for controlling the motor speed in the subsequent subroutine SCAN B up to a moment when the exposure switch SW-E turns on.

Next, a subroutine RETURN is carried out for the control of the scanning arrangement from the point I to the home position.

Figure 14A:
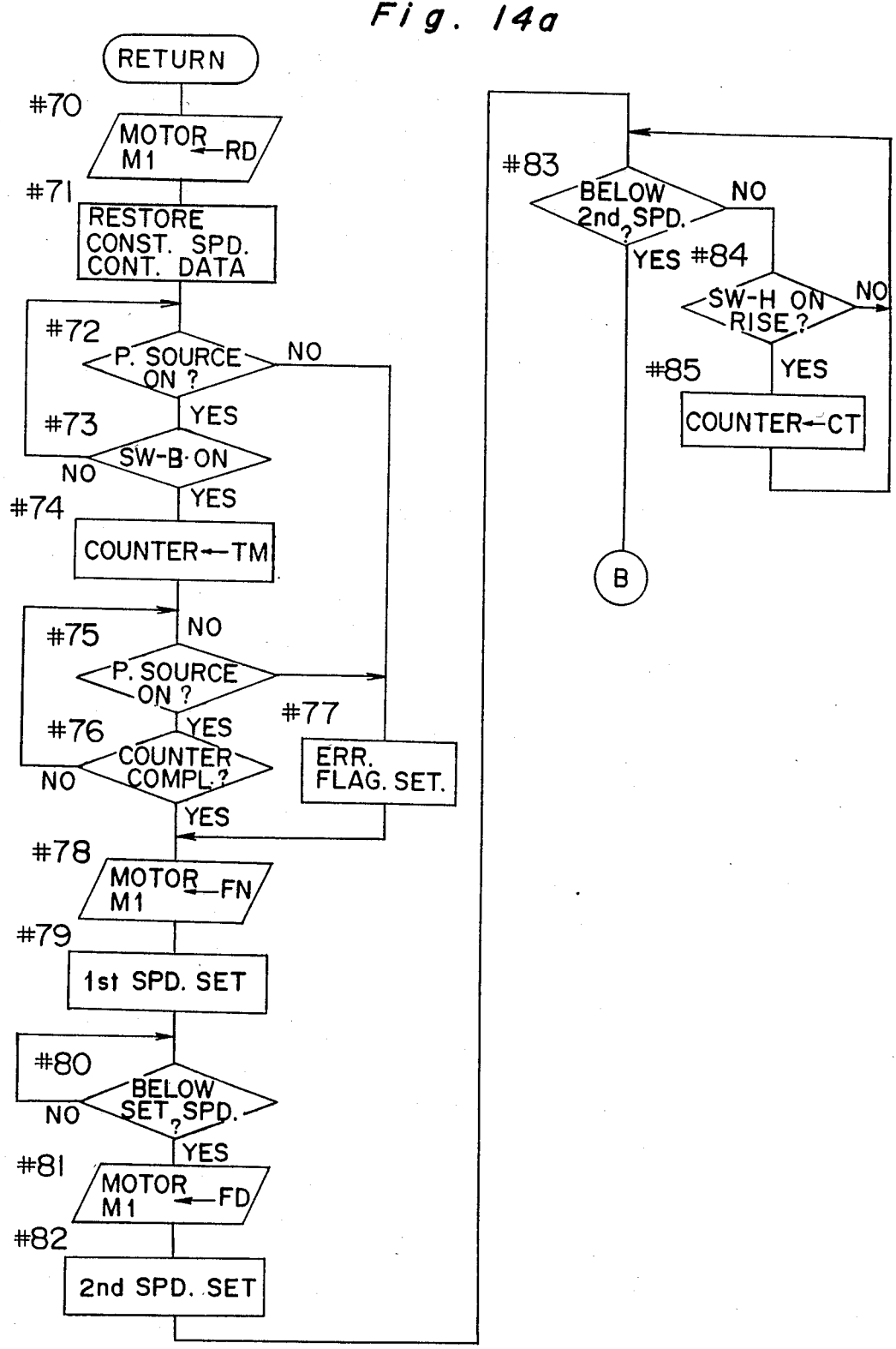
FIGS. 14a and 14b show a subroutine for carrying out a return movement.
Figure 14B:
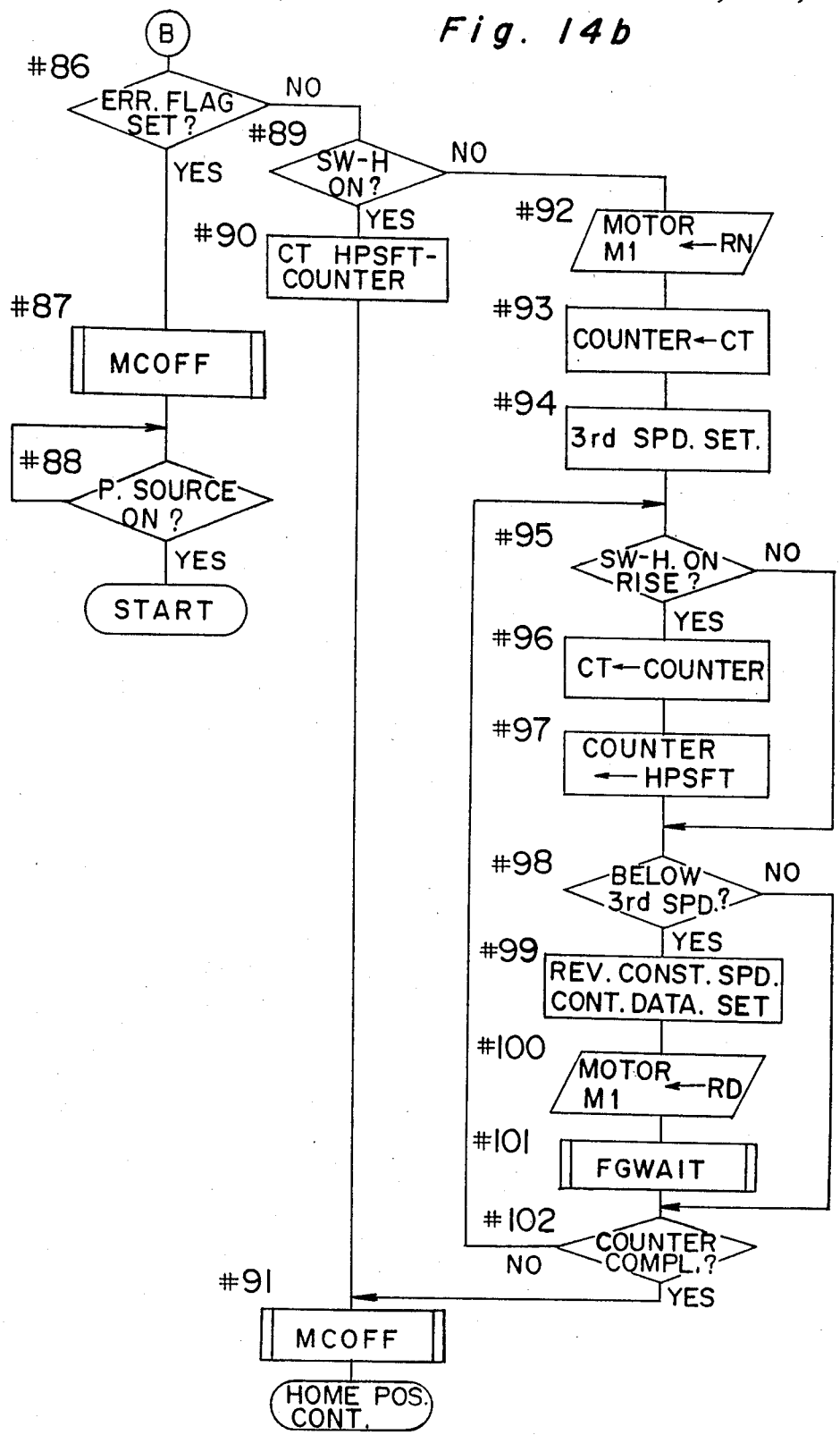

Referring to FIGS. 14a and 14b, the subroutine RETURN starts from the step #70 in which the switching circuit 7 is turned to the reverse drive mode (RD) for driving the motor M1 in the reverse direction with an incessant power. Then, in the step #71, the constant speed control data, such as FG0 and A, are restored, and in the step #72, it is checked whether or not the power source is turned on, while at the step #73, it is discriminated whether the brake switch SW-B is on or not. When the brake switch SW-B turns on, the program advances from the step #73 to the step #74 to count delay period stored in the register TM by the counter. Thus, in the step #75, it is discriminated whether or not the power source is turned on, while at the step #76, completion of the counting is waited for. It is to be noted that the set value of this register TM is the value of the initial data set at the step #31 in the return after the provisional scan, and the value as corrected in the step #51 in the return after the normal scan thereafter.

When it is ensured that the power source is off at the steps #72 and #75, an error flag is immediately set at the step #77 since the scanning arrangement 1 is in the returning during the above period, and the routine after the step #78 is carried out.

The detection of the power source off in the above step is effected by the circuit illustrated in FIG. 15, and incorporated as the power source circuit PS in FIG. 3, the construction and function of which will be described in detail later.

Still referring to FIGS. 14a and 14b, upon completion of the counting for the register TM, the mode FN is set to the control data at the step #78 for application of the regenerative brake mode FN to the scan motor M1, and at the step #79, a first speed is set, while at the step #80, waiting is effected until the speed of the scanning arrangement 1 is reduced down to the above set speed. The first speed referred to above is the speed slightly lower than the speed at the starting of braking of the scanning arrangement, and is set at a predetermined relation according to the speed at the starting of braking as measured. Thus, the regenerative brake mode is applied until the speed of the scanning arrangement falls below said first speed, with a subsequent application of the coercive braking. Although the period for the regenerative brake mode is rather short, such brake period has an effect as a buffer during transfer into the coercive brake mode. When the speed reduction to the set speed as referred to earlier is detected, the mode FD is set to the control data at the step #81, and the forward rotation brake is applied to the motor M1, and then, a second speed is set for releasing the brake at the step #82.

By the above processing, the number of revolutions of the motor M1, i.e. the return speed of the scanning arrangement 1 is reduced, and in the case where it is judged to be lower than the second speed during the speed reduction at the step #83, the value of the register CT is set in the counter to effect the measurement for the brake correction at the step #85 by detecting the rising of the home switch SW-H turned on, and the counting is effected until the speed is reduced below the second speed.

It should be noted here that the value set in the counter at the step #85 is the value "CTo" calculated at the step #34 during the returning after the scan A, and the value "0" set at the step #52 (to be mentioned later) during the returning after the scan B.

Upon completion of the above speed reduction, it is checked, at the step #86, whether or not the error flag is set. If it is set, the power source is in the off state (steps #72 and #75), and therefore, the subroutine MCOFF is effected at the step #87 to prohibit the interruption, and at the step #88, waiting is effected until the power source is turned on for reverting to the start. However, except for the momentary cutting off of the power source, the microcomputer 8 is reset by the reset signal in the above state during the normal power source off period. Conversely, during the time up to the termination of the speed reduction, the power source off signal is emitted before the reset signal. If the time from the emission of the power source off signal up to the emission of the reset signal is short, the coercive braking time becomes short, and the speed reduction is not fully effected, with an increased speed for the entry into the return side. Therefore, a capacitor C2 is provided for delaying of the reset signal (to be mentioned later with reference to FIG. 15).

If the error flag is not set, it is judged, at the step #89, whether or not the home switch SW-H is turned on, and if it is turned on, a value obtained by subtracting the count value of the counter i.e. a distance of movement of the scanning arrangement 1 after turning on of the home switch SW-H, from the home position shift amount HPSFT, is set in the register CT. In other words, in the case where the distance of movement from the turning on of the home switch SW-H to the termination of the speed reduction is shorter than the home position shift amount HPSFT, the register CT becomes positive, and the next brake timing becomes later than at present. On the contrary, when the distance of movement up to the termination of the speed reduction is longer than the home position shift amount HPSFT, the register CT becomes negative, and the next brake timing is corrected to become earlier.

When the processing at the step #90 is executed, the subroutine MCOFF is effected at the step #91 to prohibit the interruption for conducting the home position control. In other words, the same control as in the steps #16 to #19 in the subroutine HOME described earlier is effected, and the scanning arrangement 1 is stopped at the home position.

On the other hand, if the home switch SW-H has not been turned on at the completion of the speed reduction, the mode RN is set in the control data at the step #92 for setting the scan motor M1 free, and at the step #93, the value of the register CT is set in the counter, while at the step #94, a third speed for effecting the reverse drive constant speed control is set. In the above state, the returning of the scanning arrangement 1 is based on the movement by inertia, and by detecting the rising of the turning on of the home switch SW-H at the step #95, the moving distance of the scanning arrangement 1 from the time point when the speed of said scanning arrangement has been lowered below the second speed to the time point when the home position switch SW-H is turned on, is set in the register CT at the step #96.

Subsequently, at the step #97, the home position shift amount HPSFT is set in the counter, while at the step #98, it is discriminated whether or not the speed of the scanning arrangement 1 is reduced to the third speed, and if not, the routine for the steps #102, #95 and #98 is repeated until completion of the counting. If it is found at the step #98 that the speed of the scanning arrangement 1 has reached the third speed, the reverse drive constant speed control data during the returning is set at the step #99 for effecting the reverse drive constant speed control. More specifically, at the step #100, the control data is set to the mode RD for reverse drive of the scan motor M1, while the drive ON data RD and drive OFF data are set for processing of the subroutine FGWAIT at the step #101. Thus, by waiting for the completion of the counter at the step #102, the subroutine MCOFF is effected at the step #91 for the home position control.

Figure 13:
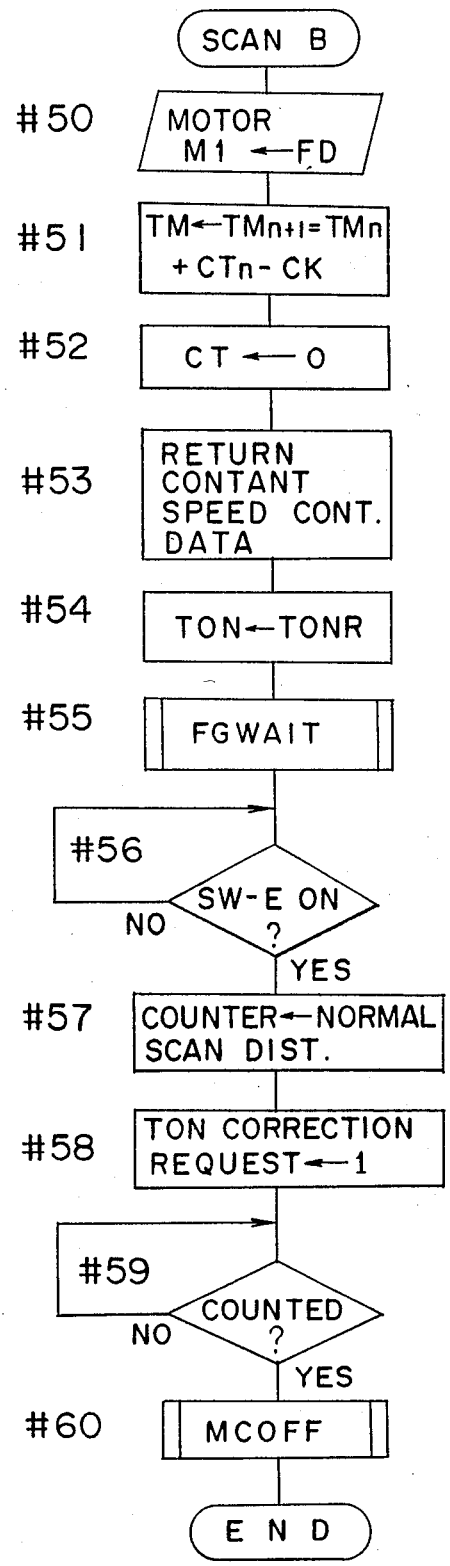
FIG. 13 shows a subroutine for carrying out a scan B.

Referring to FIG. 13, the subroutine SCAN B starts from the step #50 wherein the switching circuit 7 is turned to the forward drive mode (FD). Thus, the scanning arrangement starts to move forward from the home position, and it is accelerated with a full power at least until the first encoder pulse occurs. Also, drive-on and drive-off data are stored in the same manner as in the subroutine SCAN A. Then, in the step #51, the register TM is replaced with a new data TMn+1 calculated through a formula:

$$TMn+1 = TMn + CTn - CK$$

wherein TMn is a data previously stored in the register TM as obtained in the previous subroutine SCAN A, step #31, or SCAN B, step #51 (Under the present stage, TMn is equal to TM0 as stored in the step #31 shown in FIG. 12.), CTn is a data stored in the register CT as obtained in the previous subroutine RETURN, step #86 (Under the present stage, CTn is equal to CT0), and CK is a constant. Thus, at the present stage, a new data TM1=TM0+CT0−CK is stored in the register TM.

It is to be noted that the above given formula effects such a way to bring CTn equal to CK. In other words, when CTn is smaller than CK, it is understood that the brake mode starts rather late. Therefore, in this case, the delay time TMn+1 for the next round is corrected to have an amount smaller than TMn. Contrary, when CTn is greater than Ck, it is understood that the brake mode starts rather early. Therefore, in this case, the delay time TMn+1 is corrected to have an amount greater than TMn. In either cases, the delay time TMn+1 for the next round becomes closer to a certain amount TMc, which is obtained when CTn becomes equal to CK.

Then, in the step #52, the register CT is cleared. In the step #53, the constant speed control data, such as FG0 and A, are returned, and in the step #54, the corrected power supplying time TON stored in the register TONR in the previous step #40 (FIG. 12) is returned.

Next, in the step #55, the subroutine FGWAIT is effected to permit the interruption routines INT-T and INT-F, so that the constant speed control starts. Then, in the step #56, it is discriminated whether the exposure switch SW-E is on or not. When the exposure switch SW-E turns on, the program advances from the step #56 to #57. In the step #57, the counter is set with an amount of time for the normal scan B, and in the step #58, "1" indicating the request for the TON correction is set up. Then, in the step #59, it is discriminated whether the counter has counted the amount of time for the normal scan B or not. It is needless to say that during the counting, the interruption routines INT-F and INT-T are carried out repeatedly to maintain the scanning speed constant at the required speed Vscan. When the counter has completed counting, i.e., when the scanning arrangement has scanned all the way to the point I of the normal scan B, the program advances from the step #59 to #60. Accordingly, the subroutine MCOFF is carried out to prohibit any interruption routines (step #23) and to turn the switching circuit 7 temporarily to the reverse non-drive mode (step #24).

Figure 15:
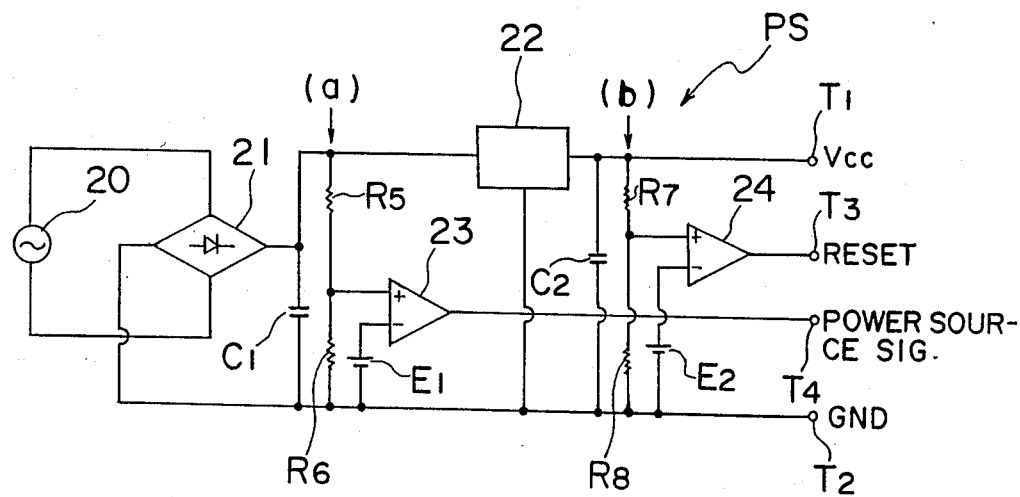
FIG. 15 is an electrical circuit diagram showing a power source circuit employed in the circuit of FIG. 3.
Figure 16:
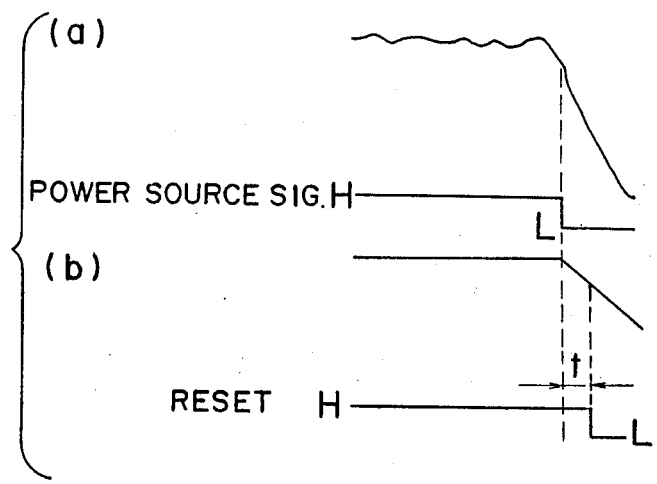
FIG. 16 shows the voltage waveform and signal waveform for the power source circuit of FIG. 15.

Referring now to FIG. 15, the power source circuit PS incorporated in the circuit of FIG. 3 will be described hereinbelow.

The power source circuit PS is so arranged as to positively apply braking to the scanning arrangement 1 by delaying the reset signal to the microcomputer 8 even when the power source is turned off during the returning of the scanning arrangement 1.

More specifically, in the power source circuit PS in FIG. 15, an A.C. power source 20 is connected to a constant voltage stabilizing circuit 22 and terminals T1 and T2 through a rectifier circuit 21, and a capacitor C1 and resistors R5 and R6 are connected in parallel between a junction of one output side of the rectifier circuit 21 and the constant voltage stabilizing circuit 22 and a junction of the other output side of the rectifier circuit 21 and the terminal T2. The input side of a comparator 23 is connected to a junction between the resistors R5 and R6 and a grounded power source E1, while the output side thereof is connected to a power source signal terminal T4. Meanwhile, another capacitor C2 and resistors R7 and R8 are connected in parallel between a junction of the constant voltage stabilizing circuit 22 and the terminal T1 and a junction of the other output side of the rectifier circuit 21 and the terminal T2. The input side of another comparator 24 is connected to a junction between the resistors R7 and R8 and a grounded power source E2, while the output side thereof is connected to a reset signal terminal T3.

When the power source is turned on, D.C. current is supplied from the terminal T1 to the scan motor M1, while the power source signal from the comparator 23 and the reset signal from the comparator 24 assume HIGH state, with a voltage being accumulated in the capacitor C2.

Normally, the scanning arrangement 1 is driven under the above state, but if the power source 20 is turned off by some causes, the power source signal from the comparator 23 immediately becomes LOW (the power source off signal is produced), while the current accumulated in the capacitor C2 is fed to the terminal T1 and the comparator 24, and the reset signal of the comparator 24 is changed over to LOW state through a predetermined time delay. The power source off signal described earlier is applied to the microcomputer 8 through the master computer MM as shown in FIG. 2, while the reset signal is directly applied to a reset terminal IR (FIG. 2) of the microcomputer 8.

By the presence of the delay time t as described above, it is possible to apply a sufficient braking to the scanning arrangement 1, and the troubles such as the accidental collision of the scanning arrangement 1 with the stopper or the like may be advantageously avoided.

As described so far, according to the present invention, even if the power source should be turned off by some causes during the returning, the control is continued by the electric power accumulated in the capacitor provided in the power source circuit for transfer into the braking mode, while the brake may be forcibly applied by the above electric power so as to stop the scanning system successfully. More specifically, upon turning off of the power source, this is detected at the steps #72 and #75 for an immediate transfer into the braking mode (regenerative brake mode to coercive brake mode), and simultaneously, by the electric power in the capacitor C2, the coercive brake subsequent to the regenerative brake is applied.

It is to be noted here that, in the foregoing embodiment, since the scanning arrangement 1 is moved by inertia during transfer from the braking state to the constant speed control during returning of the scanning arrangement 1, such transfer into the constant speed control state is effected very smoothly.

Moreover, according to the embodiment described so far, the set value ($TM_{n+1}$, the number of scannings) for the brake delay counter TM which determines the timing for applying the braking during the returning of the scanning arrangement 1, is successively corrected by the data $CT_n$ representing the moving distance in the constant speed control of the scanning arrangement 1 as measured during the constant speed control in the previous returning so as to obtain the optimum braking timing (step #51).

As represented by a control formula $$TM_{n+1} = TM_n + CT_n,$$

the above correction functions to establish the relation $CT_n = 0$. More specifically, in the case where the relation is $CT_n > 0$, it means the brake timing is earlier, and therefore, the next count set value $TM_{n+1}$ is corrected to be larger than the previous count set value $TM_n$. On the contrary, if the relation is $CT_n > 0$, the brake timing is delayed, and therefore, the next count set value $TM_{n+1}$ is corrected to be smaller than the previous count set value $TM_n$. In other words, in both of the above cases, the next count set value $TM_{n+1}$ is brought close to the constant value TM in the relation $CT_n = 0$.

As is clear from the foregoing description, the control system for the scanning arrangement according to the present invention adapted to be driven for reciprocating movements by a motor, includes the power source circuit, means for outputting a signal upon turning off of the power source, provided in said power source circuit, the capacitor means connected in parallel with said motor, provided at a stage subsequent to said power source off signal output means in said power source circuit, and the control means for driving the motor, arranged to control in such a manner as to brake said motor upon output of the power source off signal from said power source off signal output means during energization of the motor, so that said scanning arrangement is successfully reduced in speed so as to be stopped, even when the power source is turned off during movement thereof.

Accordingly, even if the power source should be turned off by some causes during movement of the scanning arrangement, the forcible braking may be applied to the motor by the electric power accumulated in the above capacitor, and accidental collision of the scanning arrangement with a stopper member, etc. may be advantageously prevented.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A control system for a scanning arrangement adapted to be driven for reciprocating movements by a motor, which comprises a power source circuit, means for outputting a signal upon turning off of the power source, provided in said power source circuit, a capacitor means connected in parallel with said motor, provided at a stage subsequent to said power source off signal output means in said power source circuit, and a control means for driving the motor, arranged to control in such a manner as to brake said motor upon output of the power source off signal from said power source off signal output means during energization of the motor, whereby said scanning arrangement is successfully reduced in speed so as to be stopped, even when the power source is turned off during movement thereof.

2. A control system as claimed in claim 1, wherein said motor is a D.C. motor, said control means supplying electric power stored in said capacitor means so as to drive said scanning arrangement in a direction opposite to the moving direction thereof.

3. A control system as claimed in claim 1, wherein said motor is a D.C. motor, the braking control by said control means including one mode for supplying electric power stored in said capacitor means so as to drive said scanning arrangement in a direction opposite to the moving direction thereof and another mode for bringing the motor onto a regenerative brake mode.

4. A control system as claimed in claim 1, further including means for outputting a reset signal, provided at a stage subsequent to said capacitor means, said control means being reset by said reset signal.

5. A control system for a scanning arrangement which is arranged to be driven for reciprocating movements by a motor controlled for energization by a microcomputer, said control system comprising a power source circuit, means for generating a power source off signal at a time point when a power source is turned off, provided in the power source circuit, a capacitor means provided at a stage subsequent to said power source off signal generating means in the power source circuit, means for generating a reset signal to reset the microcomputer, provided at a stage subsequent to said capacitor means, and a control means arranged to control in such a manner as to change-over a control mode of the motor into a brake mode upon generation of said power source off signal, and to apply braking to the scanning system by an electric power stored in said capacitor means until the generation of said reset signal.

6. In an electrophotographic copying machine having a scan system for reciprocal movement during a copying mode of operation, the improvement comprising:
   an electric motor for driving the scan system from a source of electrical power, and
   means for automatically applying a braking action to the motor during movement of the scan system, upon termination of the electrical power, the braking force being based upon the existing voltage applied to the motor at the time of the power termination to stop the inertia movement of the scan system.

* * * * *